United States Patent
Jentzsch et al.

(10) Patent No.: US 12,147,417 B2
(45) Date of Patent: Nov. 19, 2024

(54) TRUSTLESS STATELESS INCENTIVIZED REMOTE NODE NETWORK USING MINIMAL VERIFICATION CLIENTS

(71) Applicant: BC Development Labs GmBH, Mittweida (DE)

(72) Inventors: Christoph Jentzsch, Mittweida (DE); Steffen Kux, Mittweida (DE); Simon Jentzsch, Mittweida (DE); Jean Paul Ruiz Depraz, Mittweida (DE)

(73) Assignee: Blockchains, Inc., Reno, NV (US)

( * ) Notice: Subject to any disclaimer, the term of this patent is extended or adjusted under 35 U.S.C. 154(b) by 31 days.

(21) Appl. No.: 17/668,296

(22) Filed: Feb. 9, 2022

(65) Prior Publication Data
US 2022/0335037 A1    Oct. 20, 2022

Related U.S. Application Data

(63) Continuation of application No. 16/384,828, filed on Apr. 15, 2019, now Pat. No. 11,281,658.
(Continued)

(51) Int. Cl.
*G06F 16/23* (2019.01)
*H04L 9/06* (2006.01)
(Continued)

(52) U.S. Cl.
CPC ...... *G06F 16/2379* (2019.01); *G06F 16/2365* (2019.01); *H04L 9/0637* (2013.01);
(Continued)

(58) Field of Classification Search
CPC ............. G06F 16/2379; G06F 16/2365; H04L 9/0637; H04L 9/0643; H04L 9/3218; H04L 67/12
See application file for complete search history.

(56) References Cited

U.S. PATENT DOCUMENTS

| 4,569,015 A | 2/1986 | Dolev et al. |
| 6,671,821 B1 | 12/2003 | Castro et al. |

(Continued)

FOREIGN PATENT DOCUMENTS

| CN | 107077674 A | 8/2017 |
| CN | 107230056 A | 10/2017 |

(Continued)

OTHER PUBLICATIONS

Bahga, A. et al., "Blockchain Platform for Industrial Internet of Things," Journal of Software Engineering and Applications, vol. 9, No. 10, Oct. 28, 2016, pp. 533-546.
(Continued)

*Primary Examiner* — Huawen A Peng

(57) ABSTRACT

A system and a method are disclosed for using a client that is unsynchronized with a blockchain network to validate blockchain transactions for IoT devices, web apps, mobile apps, and other applications. The client retrieves a register of nodes (acting as information provider or validator) that are synchronized with the blockchain network, selects a node from the register, and transmits an information request to the selected node. The client receives a response to the request, the response including the requested information and validation indicia (e.g., proofs), and determines whether the response is valid based on the validation indicia. The client transmits, in response to determining that the response is valid, a confirmation to the IoT device, web app, mobile app or other applications.

39 Claims, 4 Drawing Sheets

Related U.S. Application Data

(60) Provisional application No. 62/658,496, filed on Apr. 16, 2018.

(51) Int. Cl.
  H04L 9/32 (2006.01)
  H04L 67/12 (2022.01)
  H04L 9/00 (2022.01)

(52) U.S. Cl.
  CPC .......... H04L 9/0643 (2013.01); H04L 9/3218 (2013.01); H04L 67/12 (2013.01); H04L 9/50 (2022.05)

(56) References Cited

U.S. PATENT DOCUMENTS

| | | |
|---|---|---|
| 10,164,983 B2 | 12/2018 | Chen et al. |
| 10,521,623 B2 | 12/2019 | Rodriguez et al. |
| 10,616,324 B1 | 4/2020 | Kaddoura |
| 10,642,967 B2 | 5/2020 | Balaraman et al. |
| 10,790,976 B1* | 9/2020 | Raevsky .............. G06Q 20/065 |
| 10,915,891 B1* | 2/2021 | Winklevoss .......... H04L 9/3255 |
| 11,669,833 B1* | 6/2023 | Cheung .............. G06Q 20/3827 705/75 |
| 2015/0156266 A1 | 6/2015 | Gupta |
| 2016/0182497 A1 | 6/2016 | Smith |
| 2016/0254910 A1 | 9/2016 | Finlow-Bates |
| 2016/0275461 A1 | 9/2016 | Sprague et al. |
| 2016/0342977 A1* | 11/2016 | Lam .................... G06Q 20/0658 |
| 2017/0011460 A1* | 1/2017 | Molinari ............... H04L 9/3247 |
| 2017/0116693 A1* | 4/2017 | Rae ....................... G06Q 50/184 |
| 2017/0134162 A1* | 5/2017 | Code .................... H04L 9/0643 |
| 2017/0221052 A1 | 8/2017 | Sheng et al. |
| 2017/0228731 A1* | 8/2017 | Sheng ................... G06Q 20/36 |
| 2017/0344987 A1 | 11/2017 | Davis |
| 2018/0039667 A1 | 2/2018 | Pierce et al. |
| 2018/0083785 A1 | 3/2018 | Shields et al. |
| 2018/0121673 A1 | 5/2018 | Goldfarb et al. |
| 2018/0219676 A1 | 8/2018 | Mattingly et al. |
| 2018/0300382 A1 | 10/2018 | Madisetti et al. |
| 2018/0336286 A1* | 11/2018 | Shah ...................... G06F 1/163 |
| 2018/0337769 A1* | 11/2018 | Gleichauf ............. H04L 9/0637 |
| 2019/0036957 A1* | 1/2019 | Smith ................... H04L 9/3239 |
| 2019/0108362 A1 | 4/2019 | Miller |
| 2019/0116024 A1 | 4/2019 | Wright et al. |
| 2019/0156026 A1 | 5/2019 | Liao et al. |
| 2019/0158470 A1 | 5/2019 | Wright et al. |
| 2019/0165930 A1 | 5/2019 | Castinado et al. |
| 2019/0180276 A1 | 6/2019 | Lee et al. |
| 2019/0188698 A1* | 6/2019 | Wu ...................... G06Q 20/3678 |
| 2019/0197532 A1 | 6/2019 | Jayachandran et al. |
| 2019/0207912 A1 | 7/2019 | Nielson et al. |
| 2019/0245856 A1 | 8/2019 | Irwan et al. |
| 2019/0287105 A1* | 9/2019 | Fedorov ............... G06Q 20/401 |
| 2019/0340170 A1 | 11/2019 | Pierce et al. |
| 2019/0349190 A1 | 11/2019 | Smith et al. |
| 2019/0349261 A1 | 11/2019 | Smith et al. |
| 2019/0349426 A1 | 11/2019 | Smith et al. |
| 2019/0372834 A1 | 12/2019 | Patil et al. |
| 2019/0384748 A1 | 12/2019 | Roennow et al. |
| 2020/0137082 A1 | 4/2020 | Jimenez-Delgado |
| 2020/0296111 A1* | 9/2020 | Karame ................ H04L 9/3239 |
| 2020/0336475 A1 | 10/2020 | Padmanabhan et al. |
| 2020/0389321 A1 | 12/2020 | Fletcher et al. |
| 2020/0394652 A1 | 12/2020 | Youb et al. |
| 2020/0412731 A1 | 12/2020 | Gulbrandsen |
| 2021/0091994 A1 | 3/2021 | Meirosu et al. |

FOREIGN PATENT DOCUMENTS

| | | |
|---|---|---|
| CN | 107579848 A | 1/2018 |
| JP | 2017-204706 A | 11/2017 |
| JP | 2018-515048 A | 6/2018 |
| KR | 10-2310803 B1 | 10/2021 |
| WO | WO 2016/164496 A1 | 10/2016 |
| WO | WO 2017/187396 A1 | 11/2017 |
| WO | WO 2017/187397 | 11/2017 |

OTHER PUBLICATIONS

Japan Patent Office, Office Action, JP Patent Application No. 2020-556929, dated Apr. 27, 2021, four pages.

Novo, O., "Blockchain Meets IoT: An Architecture for Scalable Access Management in IoT," IEEE Internet of Things Journal, vol. 5, No. 2, Apr. 2018, pp. 1184-1195.

PCT International Search Report and Written Opinion, PCT Application No. PCT/IB2019/000499, dated Sep. 27, 2019, 15 pages.

Pustisek, M et al., "Approaches to Front-End IoT Application Development for the Ethereum Blockchain," Procedia Computer Science, vol. 129, Apr. 13, 2018, pp. 410-419.

Simonsson, G., "Ethereum Probabilistic Micropayments," Oct. 29, 2017, six pages [Online] [Retrieved on Jun. 17, 2019] Retrieved from the Internet <URL: https://medium.com/@gustav.simonsson/ethereum-probabilistic-micropayments-ae6e6cd85a06>.

Korean Intellectual Property Administration, Office Action, KR Patent Application No. 10-2021-7031690, Jun. 14, 2022, six pages.

United States Office Action, U.S. Appl. No. 16/384,828, filed Dec. 23, 2020, 16 pages.

United States Office Action, U.S. Appl. No. 16/384,828, filed Jul. 21, 2020, 13 pages.

United States Office Action, U.S. Appl. No. 16/384,828, filed Mar. 24, 2020, ten pages.

* cited by examiner

TRUSTLESS STATELESS INCENTIVIZED REMOTE NODE NETWORK USING MINIMAL VERIFICATION CLIENTS

CROSS REFERENCE TO RELATED APPLICATIONS

This application is a continuation of U.S. application Ser. No. 16/384,828, filed Apr. 15, 2019, now U.S. Pat. No. 11,281,658, which application claims the benefit of U.S. Provisional Application No. 62/658,496, filed Apr. 16, 2018, the disclosure of which is hereby incorporated by reference herein in their entirety.

TECHNICAL FIELD

The disclosure generally relates to the field of lightweight devices, such as Internet-of-Things (IoT) devices, and more specifically relates to remote processing of blockchain interactions for the lightweight devices without compromising on decentralized and trustless aspects of blockchain technology. The disclosure relates to similar processing in the context of applications, such as web apps and mobile apps.

BACKGROUND

Deployment of devices with low processing capacity, low bandwidth capacity (e.g., limited connectivity to the Internet), and/or low power capacity (referred to collectively as "lightweight devices" herein), such as IoT devices, is becoming ubiquitous. Due to the processing, bandwidth, and/or power constraints of lightweight devices, processing and validating blockchain interactions for these lightweight devices requires some form of compromise in related art implementations. For example, many related art implementations for interacting with a blockchain or other DLT (Distributed Ledger Technology) network require a client to be installed on a device that is attempting to interact with the blockchain or DLT network. Recognizing that some devices have capacity constraints, related art systems developed pruned and light versions of their clients (e.g., reducing data capacity requirements down from 200 GB to 40 GB or even 50 MB).

There are scenarios, however, where lightweight devices do not have capacity to handle even the most lightweight version of a client for facilitating blockchain or DLT interactions. In such scenarios, related art systems facilitate blockchain interactions using clients installed remotely at a server (referred to herein as a "remote client"). Remote client implementations, however, compromise on the central tenets of blockchain or DLT interactions, as they require the lightweight device interacting with the remote client to trust a particular central server, thus defeating the decentralization aspect that has popularized blockchain or DLT use. Moreover, the remote client implementations cause a single point of failure to form, in that should the server hosting the remote client fail, then the lightweight device relying on the remote client to process a blockchain or DLT interaction will be unable to have the interaction processed.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium is disclosed that enables use of a remote client by lightweight devices, such as IoT devices, for processing distributed ledger interactions, while preserving the decentralized, trustless, and stateless advantages of distributed ledger interactions. To this end, a client (e.g., a minimal verification client as described below) may be installed within a lightweight device. The client is unsynchronized with a distributed ledger network may receive a transaction request from an internet-of-things (IoT) device. The client retrieves a register of nodes (acting as information provider and/or validator), the nodes each being synchronized with the distributed ledger network, and selects an information provider node from the register. The client transmits a request for information (transaction information, information from accounts, smart contracts, etc.) on the distributed ledger network, and receives a response to the request, the response including the information itself and validation indicia (e.g., signed block hashes, proofs (e.g., a Merkle proof), etc.). The client determines whether the response is valid based on the validation indicia, and transmits, in response to determining that the response is valid, a confirmation to the IoT device. One example of a distributed ledger is a blockchain. For ease of discussion, the embodiments disclosed herein will be in the context of a blockchain. It is noted, however, that the principles disclosed herein may apply to other forms of electronic distributed ledgers. While the systems and methods disclosed herein are described using IoT as application, the same mechanisms apply also to web apps, mobile apps and other software, especially with restricted resources.

System Architecture

Figure 1:
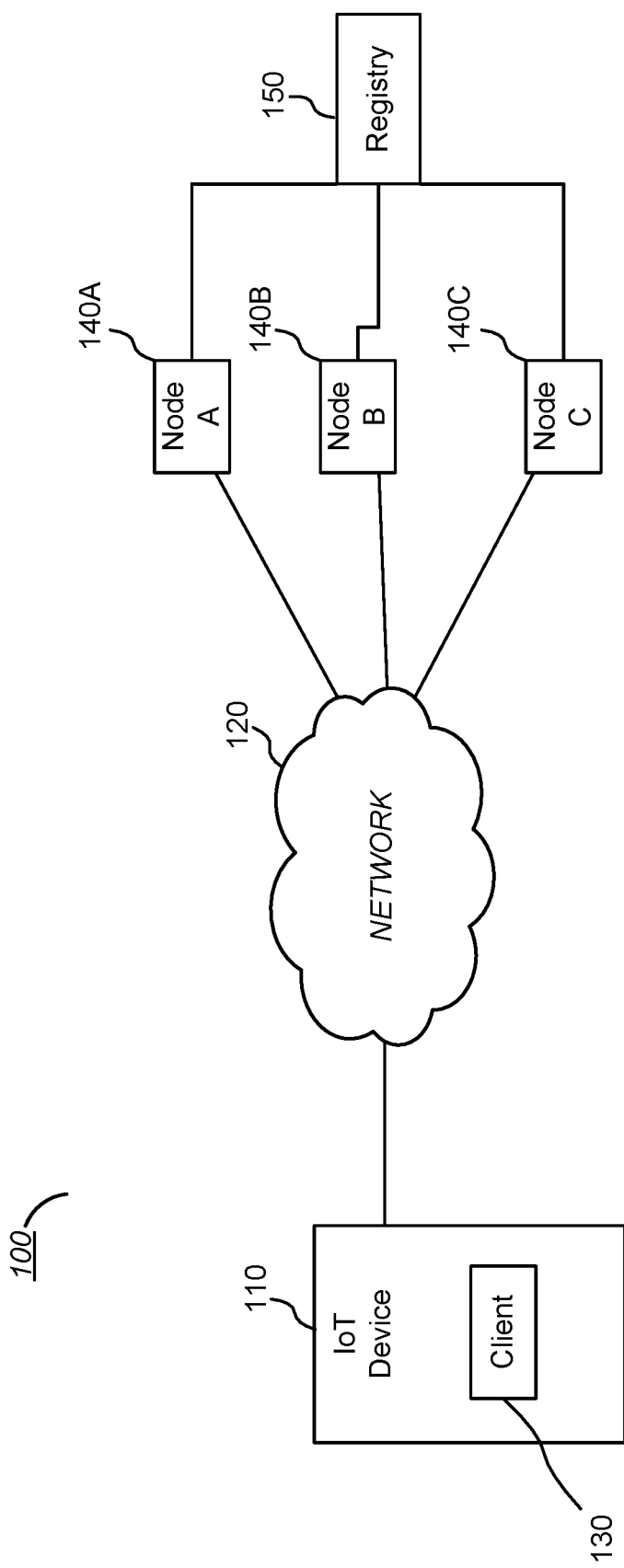
FIG. 1 illustrates one embodiment of a system that implements a trustless, stateless remote client for facilitating blockchain interactions by a lightweight device or application.

FIG. 1 illustrates one embodiment of a system that implements a trustless, stateless remote client for facilitating blockchain interactions by a lightweight device. System 100 includes IoT device 110, client 130, one or more nodes 140, and registry 150. The system also includes a network 120 through which IoT device 110 (and client 130, which is executed by IoT device 110), and nodes 140. While only one IoT device 110 is depicted, this is merely for convenience; any number of IoT devices may be within system 100. Moreover, the use of the term "IoT device" is used for convenience as well; any lightweight device or application, as described herein, may be used wherever the term IoT device or IoT device 110 is mentioned. As described above, the term IoT stands for "Internet of Things," and is a term of art used to refer to devices that are Internet-enabled, including devices that do not traditionally have Internet connectivity (e.g., a bicycle lock with Internet connectivity). An IoT device may not have direct Internet connectivity, and may still be an IoT device if it is configured to access the Internet indirectly (e.g., by way of a short range communication with another device that has direct Internet connectivity). Unlike conventional computing devices, IoT devices (and lightweight devices generally) typically have very limited processing resources and capabilities, including processing power, memory, and storage capacity and connectivity bandwidth. Hence, their functional capabilities are considerably limited.

In an embodiment, IoT device 110 is a lightweight device that has a constraint, as described above, that prevents IoT device 110 from running a local full or light client (as described above) for performing and fully verifying blockchain interactions as a member of a peer-to-peer blockchain network. The term blockchain interaction, as used here, may refer to a blockchain transaction that is memorialized by acquiring general blockchain information, interacting with accounts, or using a blockchain smart contract. The manner in which blockchain interactions are processed is described in further detail with respect to FIG. 3 below. Given the lack of a local full or light client on IoT device 110 that can fully process a blockchain interaction by being synchronized to the network, client 130 of IoT device 110 transmits a request through network 120 to perform a blockchain interaction. Client 130 is a client that is unsynchronized with a blockchain network. Network 120 is described in further detail below with respect to FIG. 2.

Client 130 validates a response from a node relating to the transaction. To obtain the response, client 130 selects a node of nodes 140 for processing the request, where nodes 140 are synchronized with the blockchain network. The manner in which the selected node processes the request is described in further detail below with respect to FIGS. 3 and 4. The node may request further validation from other nodes of node 140 when processing the interaction, as will be described in further detail below.

Client 130 may select which of nodes 140 will process the blockchain interaction by retrieving from storage of IoT device 110 a list of nodes 140, from which client 130 may randomly, or pseudo-randomly, select a node. Initially, client 130 may be configured to contact a default set of nodes, and may request from a node of the default set of nodes an up-to-date register of nodes. The node may retrieve an up-to-date register of nodes 140 from registry 150 and transmit the up-to-date register to client 130. Registry 150 is a smart contract on the blockchain that catalogs nodes 140. Nodes 140 may be listed within registry 150 based on nodes 140 transmitting a request to registry 150 to subscribe to registry 150. The manner in which client 130 selects which of node 140 will process the blockchain interaction is described in further detail below with respect to FIGS. 3 and 4. While three nodes, node 140A, node 140B, and node 140C, are depicted as forming nodes 140, any number of nodes may form nodes 140.

Computing Machine Architecture

Figure 2:
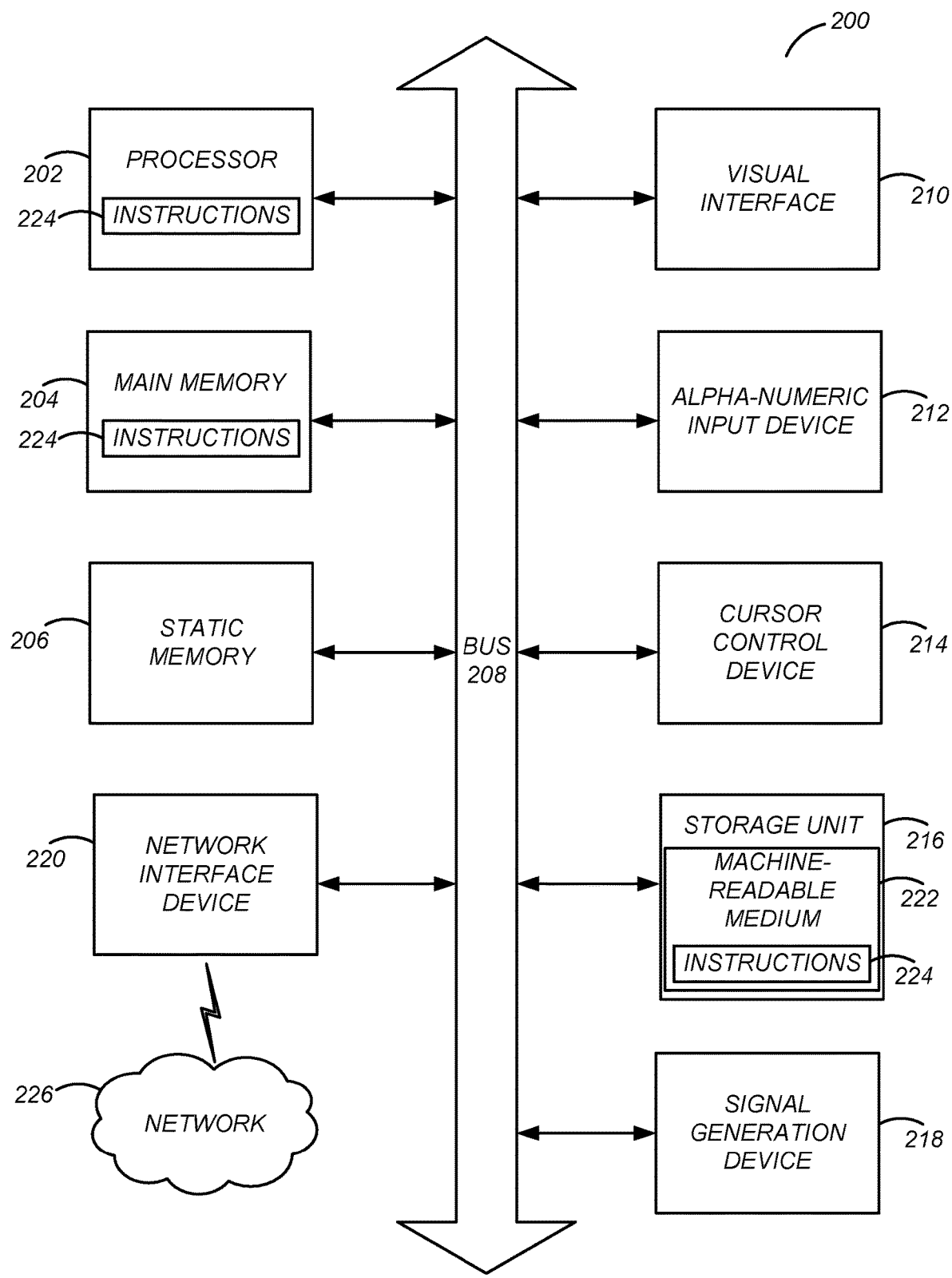
FIG. 2 is a block diagram illustrating components of an example machine able to read instructions from a machine-readable medium and execute them in a processor (or controller).

FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which program code (e.g., software) for causing the machine to perform any one or more of the methodologies discussed herein may be executed. Some or all of the components of computer system 200 may be representative of a computer system of IoT device 110 or other lightweight devices or application as discussed herein; however, as discussed above, such components may provide limited capacity with respect to more robust computing systems. Some or all of the components of computer system 200 may also be representative of a computing device running client 130, a computing device hosting registry 150, and a computing device running any of nodes 140. The program code may be comprised of instructions 224 executable by one or more processors 202. Note that IoT device 110 and other lightweight devices may have simple processors or controllers, while client device 130 ma have conventional computer processors often found in smartphones or personal computers (PCs). In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

For complex computing systems such as a system running client 130 or registry 150, the machine may be, for example, a server computer, a client computer, a personal computer (PC), a tablet PC, a set-top box (STB), a personal digital assistant (PDA), a cellular telephone, a smartphone, a web appliance, a network router, switch or bridge. The IoT device (or other lightweight devices) may be a doorbell, a thermostat, a refrigerator, a bicycle lock, etc. Any of the machines may be capable of executing instructions 224 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), and/or any combination of these), a main memory 204, and a static memory 206, which are configured to communicate with each other via a bus 208. The computer system 200 may further include visual display interface 210. Lightweight devices, such as IoT device 110, may exclude some of these components, as described above, as they may have limited capacity to perform a dedicated function. Client 130 of IoT device 110 may be a minimal verification client.

The term minimal verification client as used herein may refer to a blockchain or DLT client that is not part of a peer-to-peer network (e.g., blockchain network), but is nonetheless configured to acquire information of the blockchain or DLT in a decentralized way (e.g. using a RPC interface). Minimal verification clients do not store any information of the state of the blockchain. Minimal verification clients are configured to (1) verify and (2) validate data from the blockchain or DLT.

In order to perform verification, minimal verification clients use validation indicia, such as accompanying proofs that the client can use to evaluate and confirm that the returned information belongs to the delivered block (using for instance the Merkle-proof of this information). In order to perform validation, minimal verification clients are configured to validate, on their own, that the delivered block belongs to the blockchain or DLT by requesting this information from other nodes (validators) (e.g., nodes 140). With these characteristics, a Minimal Verification Client is blockchain-agnostic and may interact with several blockchain, DLTs and any other data service which can provide such proofs and validation information.

The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 210 may include or may interface with a touch enabled screen. The computer system 200 may also include alphanumeric input device 212 (e.g., a keyboard or touch screen keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. For lightweight devices such as IoT device 110, the storage may be limited to what is necessary to perform dedicated functions. The instructions 224 (e.g., software) may be transmitted or received over a network 226 (e.g., broadband network such as Internet, local area network, short-range network, or any other communications network) via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Exemplary Blockchain Interaction Processing

Figure 3:
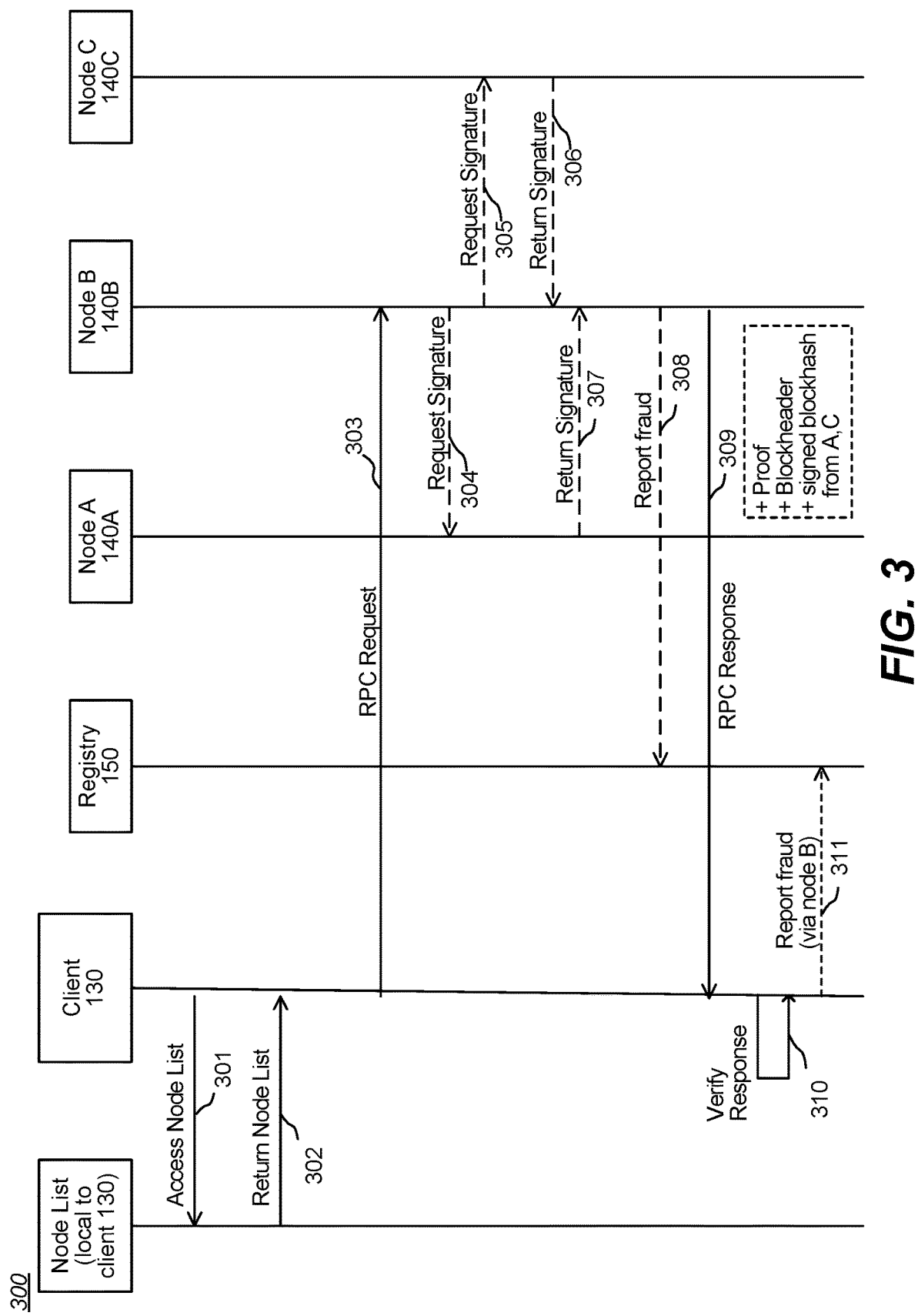
FIG. 3 illustrates a data flow diagram for validating a blockchain transaction by a trustless and stateless remote client, in accordance with some embodiments of the disclosure.

FIG. 3 illustrates a data flow diagram for validating a blockchain transaction by a minimal verification client, in accordance with some example embodiments of the disclosure. The communications depicted may occur through a network (e.g., network 120) between the machines shown (e.g., IoT device 110 and one or more nodes 140). As depicted in FIG. 3, a client (e.g., client 130) accesses a node list (e.g., by way of access node list request 301 causing memory (e.g., of IoT device 110) to return 302 the node list. Request 301 may be triggered based on IoT device 110 having received a request to process a blockchain interaction. For example, IoT device 110 may be an environment sensor that describes air quality, that can be accessed (or whose data set can be accessed) by the public (e.g., in exchange for payment of a small fee). In response to detecting that someone is requesting the data, client 130 of IoT device 110 may be triggered to retrieve the node list for processing the blockchain interaction.

As another example, IoT device 110 may be a smart bike lock that enables sharing of a bicycle. The computational power of the control unit of the bike lock may be restricted to control of the lock, and is thus only running if needed in order to save energy. Such a lock does not have capacity to process blockchain interactions for unlocking the bike lock, and thus sends out transaction request 301 using, e.g., a minimal verification client running on the lock, which enables a secure connection to the blockchain to be established at the required times via client 130, even if the Internet connection only allows for limited bandwidth.

Client 130 goes on to select a node of nodes 140 from the list of nodes for processing the transaction request. The selection is random or pseudo-random in nature. After selecting a node (e.g., node 140B) from the list of nodes, client 130 may check which node, or which several nodes, client 130 last selected. If the selected node matches the last selected node, or a recently selected node (e.g., one of the last ten nodes that were selected), then client 130 refrains from using the selected node, and instead selects another node. In an embodiment, client 130 selects multiple nodes of nodes 140 from the list of nodes for processing the transaction request. For example, to hedge against getting an invalid response from a node, client 130 may select multiple nodes and may evaluate multiple responses from those nodes to determine if the responses match. Thus, while only a selection of node 140B is depicted in FIG. 3, multiple nodes (including any of nodes A and C) performing parallel processing are within the scope of this disclosure.

Having selected a node of nodes 140, client 130 transmits a request (e.g., a Remote Procedure Call (RPC) request, a JSON-RPC request, or any other structure request) to that node. For example, as depicted in FIG. 3, client 130 has selected node 140B, and transmits RPC request 303 to node 140B. In an embodiment, upon receiving RPC request 303, node 140B processes the blockchain transaction (e.g., by updating the blockchain to reflect the transaction), and transmits RPC response 309 to client 130. While a blockchain transaction request is generally discussed herein as an RPC request for verifying a transaction, blockchain transaction requests as described herein may be for other purposes as well, such as a request to return a verified result of a function call in a smart contract, or a simple request for a balance of an account or any other type of stored data in the blockchain. Client 130 receives RPC response 309 and verifies RPC response 309. Client 130 is able to verify RPC response 309 on its own based on the contents of RPC response 309. In an embodiment, RPC response 309 includes a proof. Client 130 solves the proof to obtain a result ("proof of result"), and compares the result to a result indicated in RPC response 309. Client 130, in response to determining that the result of the proof matches the result indicated in RPC response 309, determines that RPC response 309 includes a valid result, and thus validates the transaction upon the verification. In an embodiment, RPC response 309 incudes a blockheader. Client 130 uses the blockheader to reference a blockchain ledger to validate the transaction.

RPC response 309 may also include a signature, such as a signed blockhash or any other verified piece of data that can be used to compare the result of a proof, from one or more other nodes of nodes 140. For example, RPC request 303 may request that node 140B validate its results with one or more other nodes of nodes 140, in order to improve the likelihood of receiving a valid response. Thus, prior to transmitting RPC response 309 to client 130, node 140B may request 304 a signature from node 140A, and/or may transmit request 305 for a signature from node 140C. Node 140C may transmit a return signature 306 to node 140B for inclusion in RPC response 309. Similarly, node 140A may transmit a return signature 307 to node 140B for inclusion in RPC response 309. The return signature from nodes 140A and 140C may include a signed blockhash, or any other data required for client 130 to confirm the validation indicia (e.g., proof data). In an embodiment, upon receiving a return signature, node 140B validates whether the signed blockhash is valid. If the signed blockhash (e.g., as received in 306 or 307) is invalid, node 140B may report fraud 308 to registry 150, and registry 150 may take remedial action (as described above and below), such as removing the offending node from registry 150.

Client 130 may verify 310 the RPC response, and if the verification is successful, client 130 may validate the result from node 140B received within RPC response (e.g., based on solving the above-mentioned proof, utilizing the blockheader, or based on one or more blockheaders derived from signed blockhashes from one or more additional nodes). In response to validating the result from node 140B, client device 130 may confirms successful processing of the transaction, and may signal to IoT device 110 to take resultant action (e.g., unlock a smart bike lock, or transmit sensor information to a requesting user). In response to determining that the RPC response is invalid, client 130 may report 311 fraud to registry 150 (e.g., by transmitting a request to node 140A to report node 140B), and registry 150 may take remedial action (e.g., removal of node B from the registry).

Watchdog Implementation

The disclosed embodiments beneficially allow for a watchdog implementation that prevents nodes of nodes 140 from acting fraudulently or maliciously. The watchdog implementation removes nodes of nodes 140 from registry 150 when misbehavior, such as fraudulent or malicious activity, is reported to registry 150. In an embodiment, misbehavior is detected and reported by the nodes themselves (virtual watchdogs) or by special nodes running to check other nodes behavior (watchdog nodes). For example, in response to receiving RPC response 309, client 130 may determine (e.g., based on the proof or the blockheader) that the result received from node 140B is incorrect. A node acting as watchdog may instead transmit communication 311 to registry 150 to report the misbehavior. Registry 150 may responsively remove node 140B from the list of nodes 140 that will be used by client 130 (or any other client) to process future transactions.

Alternatively, client 130 may blacklist node 140B, while refraining from reporting 311 fraud to the registry (via a node). For example, client 130 may store to a data structure the identity of node 140B in connection with a "do not use" flag, where, when nodes are selected for processing an RPC request 303, client 130 double checks those nodes against the blacklist to determine whether a "do not use" flag is present, which would prompt selection of a different node. As yet another alternative, client 130 may, when determining that the result received from node 140B is incorrect, document the incorrect result (e.g., by incrementing a counter corresponding to incorrect results from node 140B, or by manipulating some other function reflecting frequency and/or recency of incorrect results from node 140B). The client may blacklist or report fraud when a threshold amount or threshold frequency of incorrect results from node 140B are detected. The reason why this less draconian implementation may be used is because a node may unintentionally provide an inconsistent response (e.g., in a scenario where a node has not yet synchronized with a current block, or is running on a micro fork).

Further, similar to client 130, nodes 140 themselves may maintain blacklists (or similar). For example, node 140B may store to a data structure the identity of node 140A in connection with a "do not use" flag, where, when nodes are selected for signing a result, node 140B double checks those nodes against the blacklist to determine whether a "do not use" flag is present, which would prompt selection of a different node. As yet another alternative, node 140B (or any other node) may, when determining that the signature received from, e.g., node 140C is incorrect, document the incorrect result (e.g., by incrementing a counter corresponding to incorrect results from node 140C, or by manipulating some other function reflecting frequency and/or recency of incorrect results from node 140C). The node may blacklist or report fraud when a threshold amount or threshold frequency of incorrect results from node 140C are detected. The reason why this less draconian implementation may be used is because a node may unintentionally provide an inconsistent response (e.g., in a scenario where a node has not yet synchronized with a current block, or is running on a micro fork).

In an embodiment, misbehavior is of a node of nodes 140 is reported by another node. For example, as described above, node 140B may transmit request 304 to node 140A, and node 140A may responsively return 307 the signature to node 140B. In response to determining that the signature is invalid, node 140B may transmit communication 308 to registry 150. Registry 150 may responsively remove a reference to node 140A from the list of nodes 140 that can be selected for validating a request by a client, or may take similar other remedial action to that described above (e.g., increment a counter corresponding to node 140A and remove node 140A if the counter exceeds a threshold). Whether it is client 130 or a node of nodes 140 reporting misbehavior, registry 150 may, responsive to removing a node from the listing of nodes, propagate the updated list of nodes to client 130 (and any other clients).

Incentivizing Behavior by Clients and Nodes

In an embodiment, nodes may be required to deposit a stake prior to being eligible to be listed on registry 150. The nodes may receive rewards from the client whose request is validated when the request is validated properly. However, the nodes may be penalized when fraudulently pretending to validate a request, not only by being rendered ineligible for validating future requests (e.g., by removal from registry 150 as described above), but also by forfeiture of the deposited stake.

Similarly, a client may refuse to transmit a reward to a node 140. Responsively, a node may blacklist or downgrade the client to prevent the node from processing additional requests from that client. The node may signal to other nodes the misbehavior as well, thus rendering an impracticability of the client to have future transactions processed.

As an additional or alternative incentive to promote good behavior by nodes 140, the client may weight nodes based on various parameters, and may use these weightings to bias the random selection of nodes listed with registry 150 for processing a transaction based on a score corresponding to the good behavior. For example, weighting may be based on a deposit amount by a given node (e.g., because a node is less likely to misbehave if it has more to lose). Weighting may additionally or alternatively be based on past performance, where a score increases (e.g., by a small unit) for each correct result delivered to a client by a node, and where a score decreases (e.g., by a large unit larger than the small unit) for each incorrect result delivered to a client by a node.

Clients (e.g., client 130 and other clients) may be grouped and assigned to one or more nodes of nodes 140. To form such grouping, each client may provide approval from an associated node. This allows a node that receives a request from a client (e.g., client 130) to use the weights determined and cataloged by that client as a criteria when selecting other nodes of nodes 140 (e.g., to provide a signed blockhash). This forms a strong incentivization for nodes 140 to deliver correct and fast responses in order to ensure the quality of the response for its clients.

Illustrative Blockchain Interaction Processing

Figure 4:
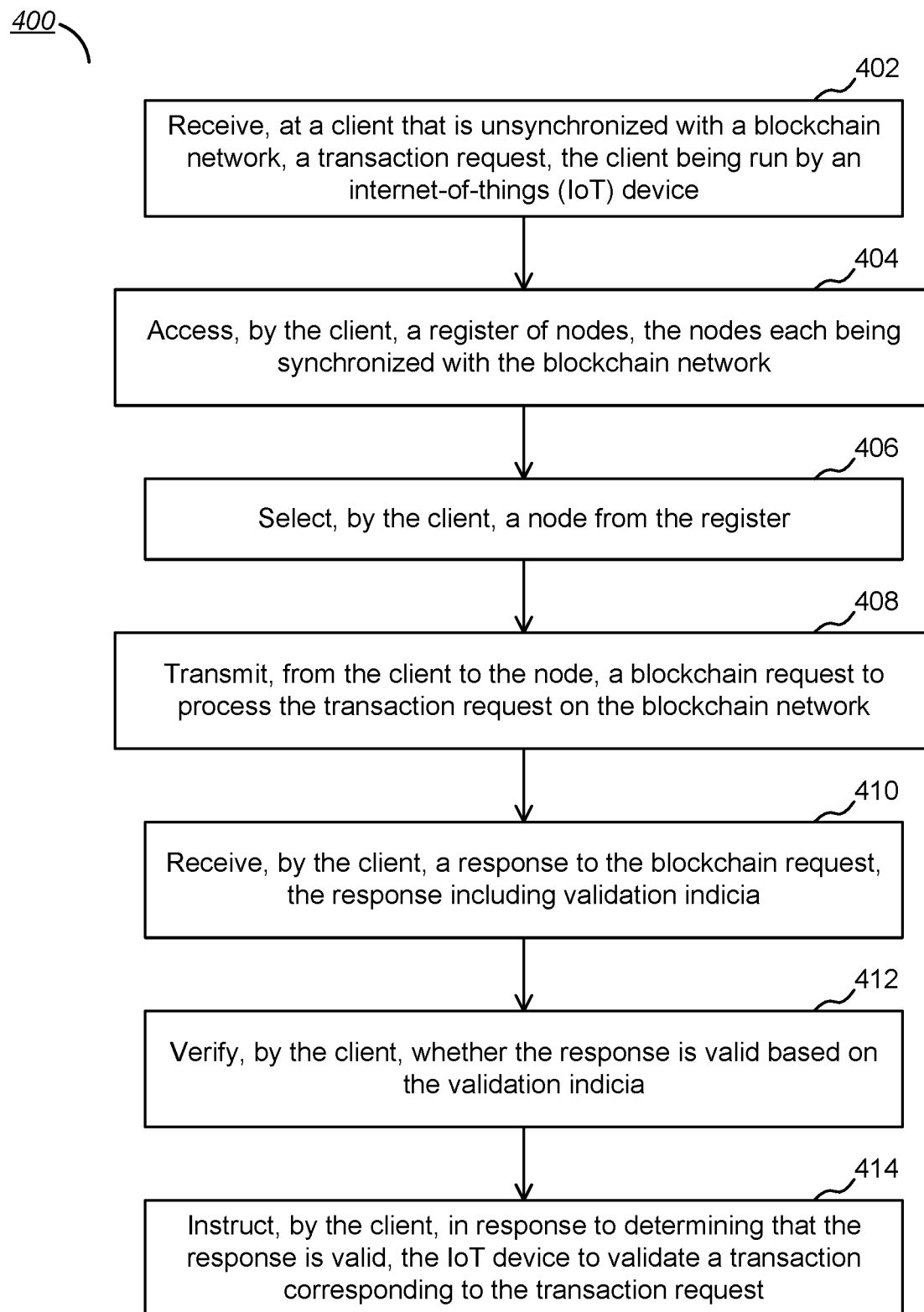
FIG. 4 illustrates a flow chart for validating a blockchain transaction of an IoT device, in accordance with some embodiments of the disclosure.

FIG. 4 illustrates a flow chart for validating a blockchain transaction from an IoT device, in accordance with some embodiments of the disclosure. Process 400 begins with the client (e.g., client 130) receiving 402 a transaction request (e.g., transaction request 301), the client being run by an IoT device (e.g., IoT device 110). Process 400 continues with the client accessing 404 a register of validation nodes (e.g., a list of nodes 140 stored at a local register to client 130, and accessed through elements 301 and 302). The client goes on to select 406 a node (e.g., node 140B) from the register (e.g., based on a random or weighted random process that yields node 140B).

The client transmits 408 a validation request (e.g., RPC request 303, transmitted to node 140B) to process the transaction request on the blockchain network. The client receives 410 (e.g., from node 140B) a response to the request (e.g., RPC response 309), the response including validation indicia (e.g., a proof, a block header, a signed blockhash from node 140A or node 140C, etc.). The client verifies 412 whether the response is valid based on the validation indicia (e.g., by solving the proof). The client, responsive to determining that the response is valid, instructs 414 the IoT device to validate a transaction corresponding to the transaction request (e.g., unlock a smart bicycle lock, or transmit requested sensor data).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module (e.g., of a lightweight device or a non-lightweight device represented by computer system 200) may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for processing blockchain interactions for IoT devices through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
sending, by a distributed ledger verification client installed within a lightweight device, a request to perform a distributed ledger interaction to a node that is synchronized with a distributed ledger network;
receiving, by the distributed ledger verification client installed within the lightweight device, a response to the distributed ledger interaction request from the node that is synchronized with the distributed ledger network, the response comprising an alleged proof of the distributed ledger interaction and an alleged result of the alleged proof; and
verifying, by the distributed ledger verification client installed within the lightweight device, that the distributed ledger interaction has been performed correctly, the verifying comprising:
processing the alleged proof of the distributed ledger interaction received from the node that is synchronized with the distributed ledger network, wherein the processing comprises feeding data through the alleged proof, thereby obtaining a processed result of the alleged proof; and
determining whether the processed result of the alleged proof matches the alleged result received from the node that is synchronized with the distributed ledger network.

2. The method of claim 1, wherein the response received from the node that is synchronized with the distributed ledger network further comprises a blockheader, and wherein the processed result of the alleged proof is obtained, at least in part, by using the received blockheader to process the alleged proof of the distributed ledger interaction.

3. The method of claim 1, wherein:
the node that is synchronized with the distributed ledger network comprises a first node;
the request to perform the distributed ledger interaction requests that the first node validate with at least one second node also synchronized with the distributed ledger network; and
the response received from the first node further comprises a validation response from the at least one second node.

4. The method of claim 3, wherein the validation response from the at least one second node comprises a signed blockhash.

5. The method of claim 4, further comprising:
using the signed blockhash from the at least one second node to obtain a derived blockheader,
wherein the processed result of the alleged proof is obtained, at least in part, by using the derived blockheader to process the alleged proof of the distributed ledger interaction.

6. The method of claim 1, further comprising:
in response to successfully verifying that the distributed ledger interaction has been performed correctly, causing the lightweight device to perform a selected action.

7. The method of claim 1, wherein:
the distributed ledger interaction comprises an interaction selected from a group consisting of:
accessing transaction information from the distributed ledger network;
interacting with an account on the distributed ledger network; and
calling a function in a smart contract on the distributed ledger network 8. The method of claim 1, further comprising:
selecting the node from a register of nodes that are synchronized with the distributed ledger network; and
in response to failing to verify that the distributed ledger interaction has been performed correctly, sending a report to an entity maintaining the register.

9. The method of claim 8, wherein the entity maintaining the register comprises a smart contract on the distributed ledger network.

10. The method of claim 1, further comprising:
maintaining trust information associated with the node that is synchronized with the distributed ledger network; and
in response to failing to verify that the distributed ledger interaction has been performed correctly, updating the trust information.

11. The method of claim 10, wherein:
the trust information comprises a value indicative of a recency of one or more incorrect results received from the node.

12. The method of claim 10, wherein the trust information comprises a value indicative of a frequency and/or an amount of one or more incorrect results received from the node, and wherein the method further comprises:
determining whether the value has reached a selected threshold; and
in response to determining that the value has reached the selected threshold, blacklisting or reporting the node.

13. The method of claim 1, further comprising:
selecting the node from a plurality of nodes that are synchronized with the distributed ledger network, wherein the selecting is based on a size of a stake deposited by the node and/or a score indicative of how the node performed in connection with past distributed ledger interaction requests.

14. A non-transitory computer-readable medium comprising stored instructions, the instructions when executed by a processor of a lightweight device cause a distributed ledger verification client installed within the lightweight device to:
send a request to perform a distributed ledger interaction to a node that is synchronized with a distributed ledger network;
receive a response to the distributed ledger interaction request from the node that is synchronized with the distributed ledger network, the response comprising an alleged proof of the distributed ledger interaction and an alleged result of the alleged proof; and
verify that the distributed ledger interaction has been performed correctly, the verifying comprising:
processing the alleged proof of the distributed ledger interaction received from the node that is synchronized with the distributed ledger network, wherein the processing comprises feeding data through the alleged proof, thereby obtaining a processed result of the alleged proof; and
determining whether the processed result of the alleged proof matches the alleged result received from the node that is synchronized with the distributed ledger network.

15. The non-transitory computer-readable medium of claim 14, wherein the response received from the node that is synchronized with the distributed ledger network further comprises a blockheader, and wherein the processed result of the alleged proof is obtained, at least in part, by using the received blockheader to process the alleged proof of the distributed ledger interaction.

16. The non-transitory computer-readable medium of claim 14, wherein:
the node that is synchronized with the distributed ledger network comprises a first node;
the request to perform the distributed ledger interaction requests that the first node validate with at least one second node also synchronized with the distributed ledger network; and
the response received from the first node further comprises a validation response from the at least one second node.

17. The non-transitory computer-readable medium of claim 16, wherein the validation response from the at least one second node comprises a signed blockhash.

18. The non-transitory computer-readable medium of claim 17, wherein the instructions when executed by the processor of the lightweight device further cause the distributed ledger verification client installed within the lightweight device to:
use the signed blockhash from the at least one second node to obtain a derived blockheader,
wherein the processed result of the alleged proof is obtained, at least in part, by using the derived blockheader to process the alleged proof of the distributed ledger interaction.

19. The non-transitory computer-readable medium of claim 14, wherein the instructions when executed by the processor of the lightweight device further cause the distributed ledger verification client installed within the lightweight device to:
in response to successfully verifying that the distributed ledger interaction has been performed correctly, cause the lightweight device to perform a selected action.

20. The non-transitory computer-readable medium of claim 14, wherein:
the distributed ledger interaction comprises an interaction selected from a group consisting of:
accessing transaction information from the distributed ledger network;
interacting with an account on the distributed ledger network; and
calling a function in a smart contract on the distributed ledger network.

21. The non-transitory computer-readable medium of claim 14, wherein the instructions when executed by the processor of the lightweight device further cause the distributed ledger verification client installed within the lightweight device to:
select the node from a register of nodes that are synchronized with the distributed ledger network; and
in response to failing to verify that the distributed ledger interaction has been performed correctly, send a report to an entity maintaining the register.

22. The non-transitory computer-readable medium of claim 21, wherein the entity maintaining the register comprises a smart contract on the distributed ledger network.

23. The non-transitory computer-readable medium of claim 14, wherein the instructions when executed by the processor of the lightweight device further cause the distributed ledger verification client installed within the lightweight device to:
maintain trust information associated with the node that is synchronized with the distributed ledger network; and
in response to failing to verify that the distributed ledger interaction has been performed correctly, update the trust information.

24. The non-transitory computer-readable medium of claim 23, wherein:
the trust information comprises a value indicative of a recency of one or more incorrect results received from the node.

25. The non-transitory computer-readable medium of claim 23, wherein the trust information comprises a value indicative of a frequency and/or an amount of one or more incorrect results received from the node, and wherein the instructions when executed by the processor of the lightweight device further cause the distributed ledger verification client installed within the lightweight device to:
determine whether the value has reached a selected threshold; and
in response to determining that the value has reached the selected threshold, blacklist or report the node.

26. The non-transitory computer-readable medium of claim 14, wherein the instructions when executed by the processor of the lightweight device further cause the distributed ledger verification client installed within the lightweight device to:
select the node from a plurality of nodes that are synchronized with the distributed ledger network, wherein the selecting is based on a size of a stake deposited by the node and/or a score indicative of how the node performed in connection with past distributed ledger interaction requests.

27. A lightweight device comprising:
a processor for executing stored computer program instructions to operate a distributed ledger verification client installed within the lightweight device; and
a non-transitory computer-readable storage medium comprising the stored computer program instructions executable by the processor, the stored computer program instructions when executed by the processor cause the distributed ledger verification client installed within the lightweight device to:
send a request to perform a distributed ledger interaction to a node that is synchronized with a distributed ledger network;
receive a response to the distributed ledger interaction request from the node that s synchronized with the distributed ledger network, the response comprising an alleged proof of the distributed ledger interaction and an alleged result of the alleged proof; and
verify that the distributed ledger interaction has been performed correctly, the verifying comprising:
processing the alleged proof of the distributed ledger interaction received from the node that is synchronized with the distributed ledger network, wherein the processing comprises feeding data through the alleged proof, thereby obtaining a processed result of the alleged proof; and
determining whether the processed result of the alleged proof matches the alleged result received from the node that is synchronized with the distributed ledger network.

28. The lightweight device of claim 27, wherein the response received from the node that is synchronized with the distributed ledger network further comprises a blockheader, and wherein the processed result of the alleged proof is obtained, at least in part, by using the received blockheader to process the alleged proof of the distributed ledger interaction.

29. The lightweight device of claim 27, wherein:
the node that is synchronized with the distributed ledger network comprises a first node;

the request to perform the distributed ledger interaction requests that the first node validate with at least one second node also synchronized with the distributed ledger network; and the response received from the first node further comprises a validation response from the at least one second node.

30. The lightweight device of claim 29, wherein the validation response from the at least one second node comprises a signed blockhash.

31. The lightweight device of claim 30, wherein the stored computer program instructions when executed by the processor further cause the distributed ledger verification client installed within the lightweight device to:

use the signed blockhash from the at least one second node to obtain a derived blockheader, wherein the processed result of the alleged proof is obtained, at least in part, by using the derived blockheader to process the alleged proof of the distributed ledger interaction.

32. The lightweight device of claim 27, wherein the stored computer program instructions when executed by the processor further cause the distributed ledger verification client installed within the lightweight device to:

in response to successfully verifying that the distributed ledger interaction has been performed correctly, cause the lightweight device to perform a selected action.

33. The lightweight device of claim 27, wherein:

the distributed ledger interaction comprises an interaction selected from a group consisting of:

accessing transaction information from the distributed ledger network;

interacting with an account on the distributed ledger network; and calling a function in a smart contract on the distributed ledger network.

34. The lightweight device of claim 27, wherein the stored computer program instructions when executed by the processor further cause the distributed ledger verification client installed within the lightweight device to:

select the node from a register of nodes that are synchronized with the distributed ledger network; and in response to failing to verify that the distributed ledger interaction has been performed correctly, send a report to an entity maintaining the register.

35. The lightweight device of claim 34, wherein the entity maintaining the register comprises a smart contract on the distributed ledger network.

36. The lightweight device of claim 27, wherein the stored computer program instructions when executed by the processor further cause the distributed ledger verification client installed within the lightweight device to:

maintain trust information associated with the node that is synchronized with the distributed ledger network; and in response to failing to verify that the distributed ledger interaction has been performed correctly, update the trust information.

37. The lightweight device of claim 36, wherein:

the trust information comprises a value indicative of a recency of one or more incorrect results received from the node.

38. The lightweight device of claim 36, wherein the trust information comprises a value indicative of a frequency and/or an amount of one or more incorrect results received from the node, and wherein the stored computer program instructions when executed by the processor further cause the distributed ledger verification client installed within the lightweight device to:

determine whether the value has reached a selected threshold; and in response to determining that the value has reached the selected threshold, blacklist or report the node.

39. The lightweight device of claim 27, wherein the stored computer program instructions when executed by the processor further cause the distributed ledger verification client installed within the lightweight device to:

select the node from a plurality of nodes that are synchronized with the distributed ledger network, wherein the selecting is based on a size of a stake deposited by the node and/or a score indicative of how the node performed in connection with past distributed ledger interaction requests.

* * * * *